No. 614,697. Patented Nov. 22, 1898.
H. J. CAILLET.
ROLLING STOCK.
(Application filed Dec. 23, 1897.)
(No Model.) 3 Sheets—Sheet 1.
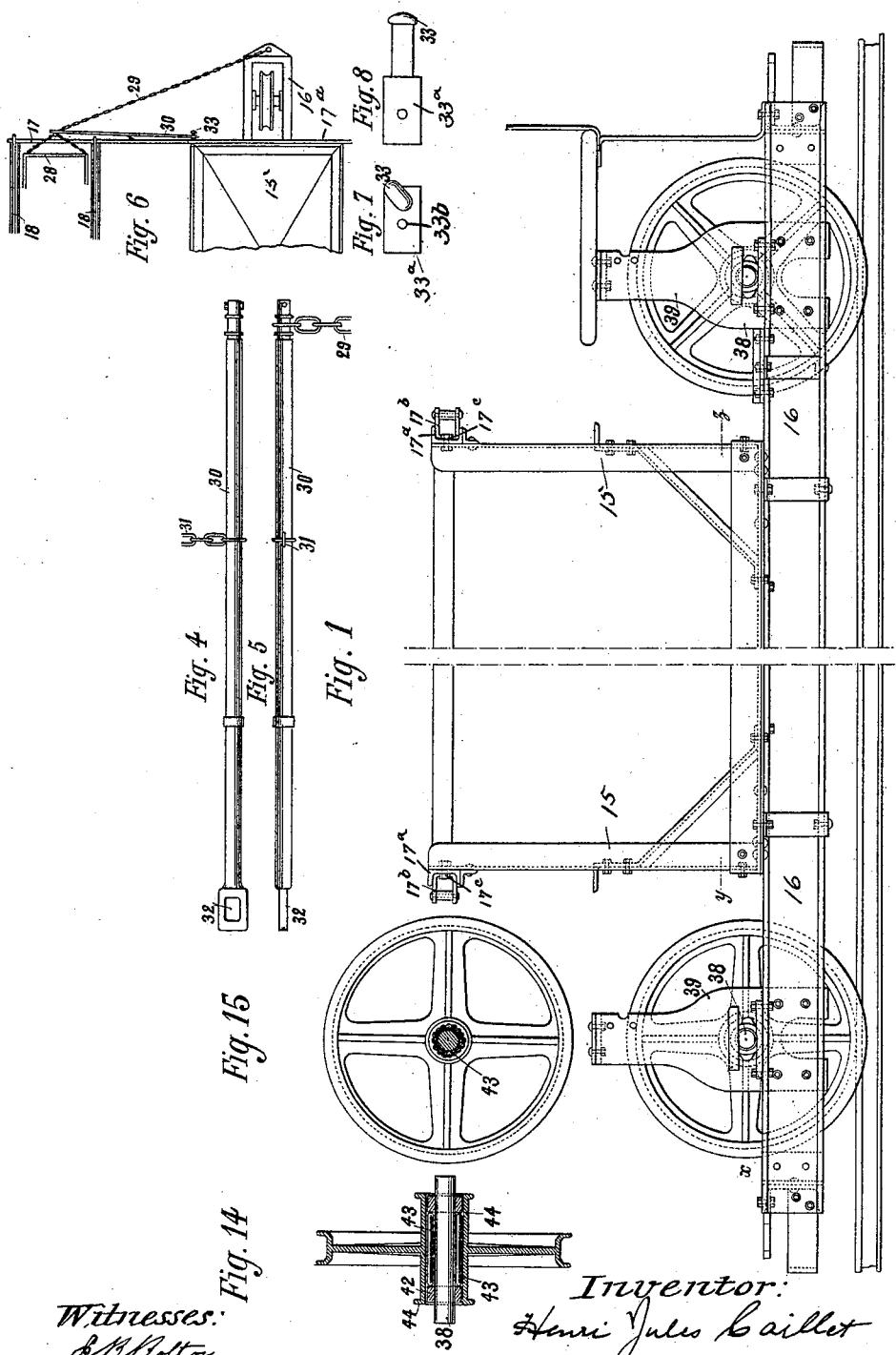

No. 614,697. Patented Nov. 22, 1898.
H. J. CAILLET.
ROLLING STOCK.
(Application filed Dec. 23, 1897.)
(No Model.) 3 Sheets—Sheet 2.
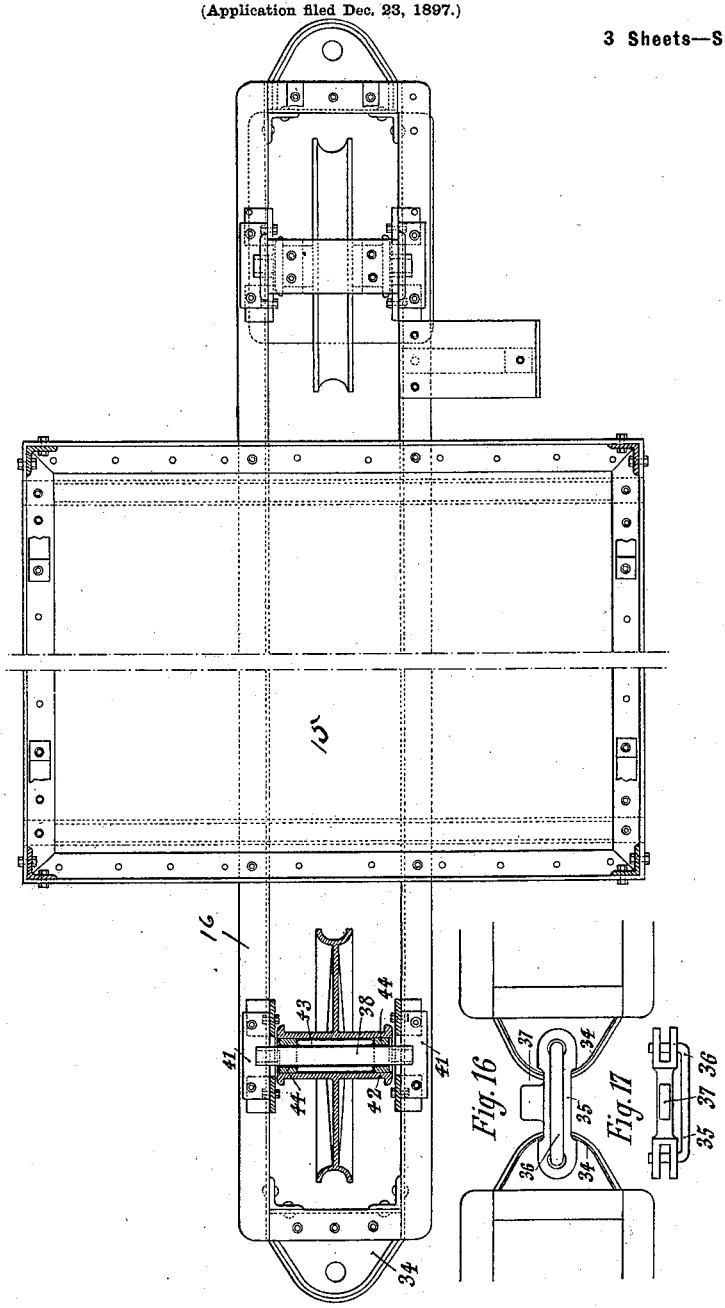
Witnesses: Inventor:
Henri Jules Caillet
By Richardson
his Attorneys.

No. 614,697. Patented Nov. 22, 1898.
H. J. CAILLET.
ROLLING STOCK.
(Application filed Dec. 23, 1897.)
(No Model.) 3 Sheets—Sheet 3.
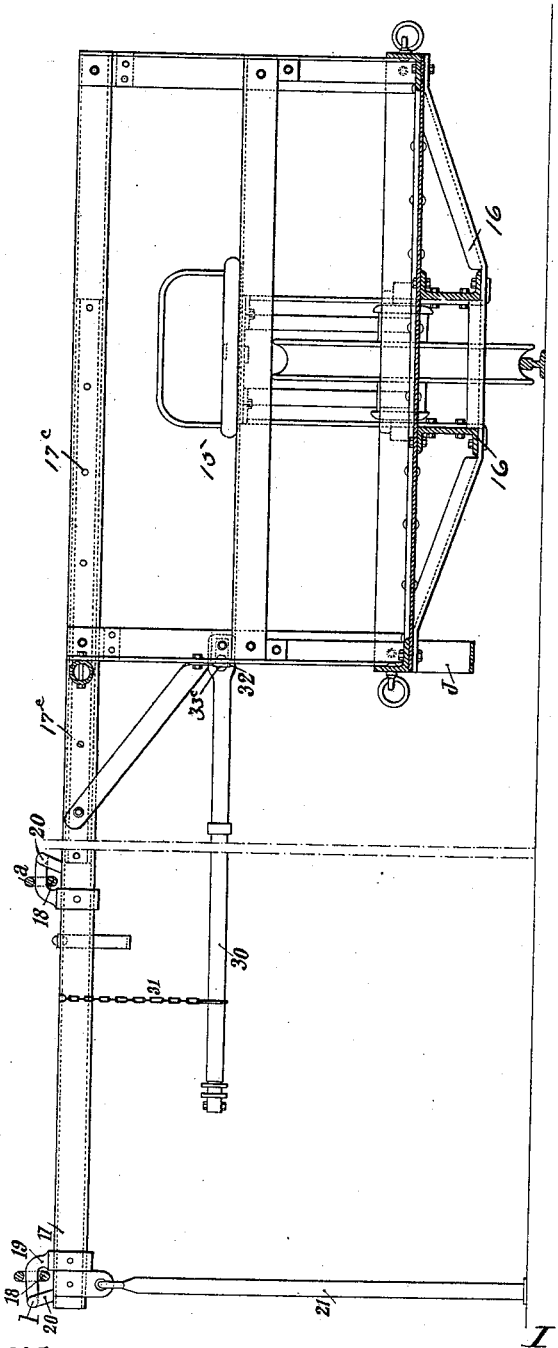

UNITED STATES PATENT OFFICE.

HENRI JULES CAILLET, OF PARIS, FRANCE.

ROLLING-STOCK.

SPECIFICATION forming part of Letters Patent No. 614,697, dated November 22, 1898.

Application filed December 23, 1897. Serial No. 663,208. (No model.)

*To all whom it may concern:*

Be it known that I, HENRI JULES CAILLET, a citizen of the French Republic, residing at Paris, France, have invented certain new and useful Improvements in Rolling-Stock, of which the following is a specification.

The invention which forms the subject of the present application relates to rolling-stock adapted for use on a one-rail track for animal or hand traction.

In the drawings, Figure 1 shows in elevation the ends of the car, the center being broken away. Fig. 2 is a plan view of Fig. 1, partly in section, on lines $x\ y\ z$. Fig. 3 is a rear end view of the car, partly in section. Figs. 4 and 5 are detail views of the bar 30. Fig. 6 is a plan view of a part of the car, showing the relative location of the draft devices. Figs. 7 and 8 are details. Figs. 9, 10, and 11 are detail views of a clasp. Figs. 12 and 13 show the ends of the shafts. Figs. 14 and 15 are views of the wheel. Figs. 16 and 17 show the coupling for two cars.

The car is shown in plan in Fig. 2, in end view in Fig. 3, and in side elevation in Fig. 1. It comprises a body 15 and frame or truck 16 and is adapted to be run upon a single rail, Fig. 3, and to be drawn by animal power, the animal being attached at one side, as in diagram in Fig. 6. The car has a wheel at front and rear having bearings in a rectangular frame, which supports the car-body. A bar 17 extends outwardly from the car at its rear end in a lateral direction, and on the extreme end of this bar is a clip carrying a prop 21, which supports the car in horizontal position when at rest. The bar 17 is of channel-iron, while the upper side bar $17^a$ of the car-body is also of channel-iron, as shown in Fig. 1. A bar $17^b$, also made of channel-iron for strength and of such size as to fit within bars 17 and $17^a$, is secured to each by bolts $17^c$, so as to break joints therewith, whereby the bar is rigidly connected to the car-body. The shafts 18 extend from this bar 17, having eyes, engaging fastenings 19, having pivoted latches 20, Figs. 3, 12, and 13, the position of the shafts 18 relatively to the car being shown in Fig. 6. A bar 30 extends out from the car, Fig. 3, one end having an eye 32, fitting over a headed projection 33, carried by the car-body, Figs. 7 and 8, and it is also supported from the bar 17 by a chain 31, Fig. 3. The projection 33 is formed as an extension of an angle-plate $33^a$, the wings of which are secured by bolts $33^b$ to the corner of the car-body. A chain 29 extends from the rear of the car to the end of the bar 30, and the singletree 28 is connected to the bar 30 or to the end of the chain 29, and the traces extend from the singletree.

In order to adjust the animal's harness on the shafts, I use special clasps, Figs. 9, 10, and 11.

The back-strap of the harness runs through the upper loop 22 and the belly-band runs through loop 23.

24 is a pivoted arm which moves around a pin 25, and 26 is a movable ring which serves to hold the shafts between the arm 24 and the hook 27.

The coupling of two cars is shown in detail in Figs. 16 and 17. A coupling-bar 35 has fork-shaped ends which engage the projecting flanges 34 of the two cars to be coupled. The forks have eyeholes corresponding to the eyeholes of the flanges 34, and a pin 36 has its bent ends passed through the openings on the flanges and forks and holds the cars together. The bar 35 has a ring 37, into which the traction-chain (not shown) may be hooked.

The wheels employed with the various cars are shown in detail in Figs. 2, 14, and 15. The felly or rim has a special section and profile, as shown in Fig. 14. It is double-flanged and caps completely the rail-flange. The wheel-groove allows the cars to pass in full safety from one rail to the other, so that the wheel-rim cannot jump on the rail-flange when junctions are passed. This special groove is very wide. The bottom or the part of the tire which runs on the rail-flange is slightly concave, so as to keep the rail always near the middle of the tire, Fig. 3. Then the tire is held to the flanges by sloping parts at an angle of fifty per cent., so that it is wide enough to pass the junctions on the rail without shock. Quite naturally the part engaged, which slants fifty per cent., brings about the lateral displacement of the wheel at each successive junction. I obtain thus a wheel of very slight deepness in groove, which nevertheless has a wide reach to seize on the various successive rails of the track in all safety, rendering it unnecessary that the rails be put together with perfect alinement.

The axle is held rigidly at its ends in the side plates 39 of the carriage or truck, while the rolling motion is secured from the hub 44 of the wheel bearing on rollers 43 around the axle, the rollers being held in by collars 42.

I claim—

1. In combination, the truck or frame, the car-body carried thereby, the bar projecting laterally from the upper portion of said body and the shafts connected to said bar, substantially as described.

2. In combination, the truck or frame, the car-body carried thereby, the bar projecting laterally from the car-body, the draft devices, and the folding prop connected to the outer end of said bar, substantially as described.

3. In combination with a car, a bar 17, projecting laterally, shafts supported thereby, a bar 30 and a singletree supported thereby substantially as described.

In witness whereof I have hereunto set my hand in presence of two witnesses.

HENRI JULES CAILLET.

Witnesses:
EMIL BERT,
SOULE MISTIC SEE.